US009902002B2

(12) United States Patent
Ning et al.

(10) Patent No.: US 9,902,002 B2
(45) Date of Patent: Feb. 27, 2018

(54) REAMERS WITH RADIALLY EXTENDING FLUTES

(71) Applicant: Kennametal Inc., Latrobe, PA (US)

(72) Inventors: Li Ning, Pleasant Unity, PA (US); Nicholas Henry, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 118 days.

(21) Appl. No.: 14/495,019

(22) Filed: Sep. 24, 2014

(65) Prior Publication Data

US 2016/0082535 A1 Mar. 24, 2016

(51) Int. Cl.
  *B23D 77/00* (2006.01)
(52) U.S. Cl.
  CPC ........... *B23D 77/006* (2013.01); *B23D 77/00* (2013.01); *B23D 2277/04* (2013.01); *B23D 2277/30* (2013.01); *B23D 2277/44* (2013.01); *B23D 2277/60* (2013.01); *Y10T 408/45* (2015.01); *Y10T 408/9095* (2015.01)
(58) Field of Classification Search
  CPC .............. B23D 77/006; B23D 2277/04; B23D 2277/30; B23D 2277/44; B23D 2277/60; Y10T 408/909; Y10T 408/9095; Y10T 408/45; Y10T 408/455
  See application file for complete search history.

(56) References Cited

U.S. PATENT DOCUMENTS

| 948,269 | A | * | 2/1910 | Crowley | ................ | B23B 51/00 |
| | | | | | | 175/413 |
| 2,372,219 | A | * | 3/1945 | Miller | .................. | B23D 77/006 |
| | | | | | | 407/11 |
| 2,807,443 | A | * | 9/1957 | Wyman | .................... | E21B 10/38 |
| | | | | | | 175/393 |
| 2,822,607 | A | * | 2/1958 | Bennett | ................. | B23B 51/107 |
| | | | | | | 408/227 |
| 2,975,441 | A | * | 3/1961 | Michele | ..................... | B23G 5/06 |
| | | | | | | 29/DIG. 67 |
| 4,705,435 | A | * | 11/1987 | Christoffel | ........... | B23D 77/006 |
| | | | | | | 407/11 |
| 5,921,727 | A | * | 7/1999 | Depperman | ........... | B23D 77/02 |
| | | | | | | 408/144 |
| 6,343,902 | B1 | | 2/2002 | Nishakawa | | |
| 7,207,752 | B2 | * | 4/2007 | Schulte | .................. | B23D 77/00 |
| | | | | | | 408/1 R |
| 7,322,779 | B2 | * | 1/2008 | Kress | .................... | B23B 31/102 |
| | | | | | | 409/232 |
| 8,398,341 | B2 | * | 3/2013 | Cohen | .................... | B23D 77/00 |
| | | | | | | 407/116 |

(Continued)

FOREIGN PATENT DOCUMENTS

| CN | 203156165 U | 8/2013 | | |
| DE | 10348061 A1 * | 5/2005 | ............... | B23C 5/28 |

(Continued)

*Primary Examiner* — Eric A Gates
(74) *Attorney, Agent, or Firm* — Ian K. Samways

(57) ABSTRACT

In one aspect, reamers having radially extending flutes are described herein. A reamer described herein comprises a cutting portion including a plurality of cutting teeth separated by flutes, the cutting teeth defining an outer diameter of the cutting portion and the flutes extending radially to define an inner diameter of the cutting portion.

16 Claims, 4 Drawing Sheets

(56) References Cited

U.S. PATENT DOCUMENTS

| | | | |
|---|---|---|---|
| 8,764,354 B2 * | 7/2014 | Schuffenhauer | B23B 31/1107 408/231 |
| 9,815,130 B2 * | 11/2017 | Dejaune | B23D 77/04 |
| 2003/0217632 A1 | 11/2003 | Kress et al. | |
| 2007/0028434 A1 * | 2/2007 | Kress | B23B 51/009 29/50 |
| 2009/0123241 A1 * | 5/2009 | Kress | B23B 27/145 407/47 |
| 2009/0123244 A1 | 5/2009 | Buettiker et al. | |
| 2010/0143055 A1 | 6/2010 | Kleiner et al. | |
| 2010/0247257 A1 | 9/2010 | Paul et al. | |
| 2013/0115017 A1 * | 5/2013 | Schanz | B23D 77/00 407/11 |

FOREIGN PATENT DOCUMENTS

| | | | |
|---|---|---|---|
| DE | 102005014337 A1 * | 8/2006 | B22F 5/10 |
| DE | 102005014377 A1 | 8/2006 | |
| DE | 102012216128 A1 | 3/2014 | |
| DE | 102013205026 A1 * | 9/2014 | B23C 5/28 |
| EP | 2298483 A1 | 3/2011 | |
| FR | 1287928 A * | 3/1962 | B23D 77/006 |
| FR | 1580843 A | 9/1969 | |
| JP | 1310816 A | 12/1989 | |
| WO | WO 2006010576 A2 * | 2/2006 | B23B 27/00 |

\* cited by examiner

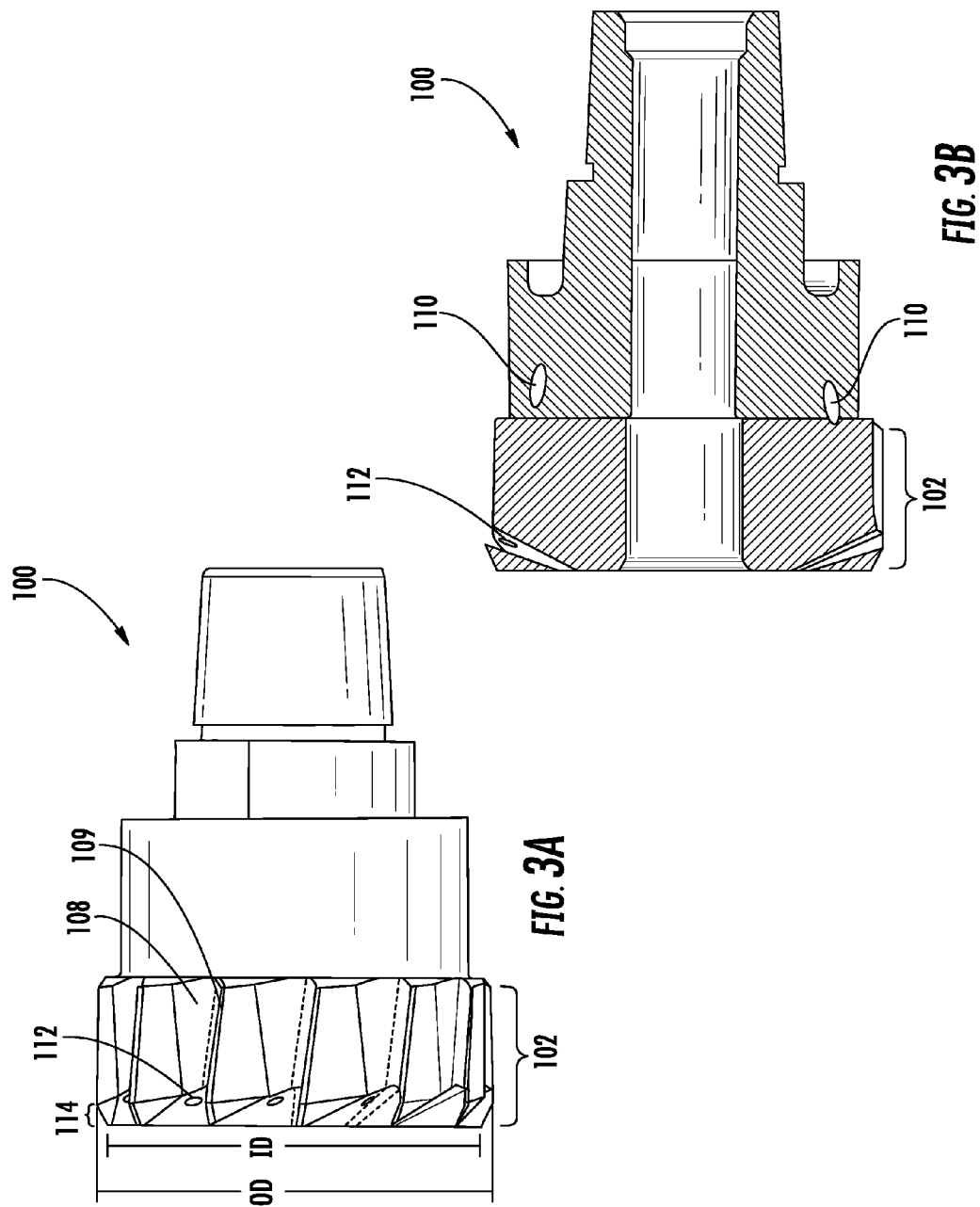

REAMERS WITH RADIALLY EXTENDING FLUTES

FIELD

The present invention relates to reamers and, in particular, to reamers employing one or more radial flutes.

BACKGROUND

Reamers of various designs and construction are well known and advantageously employed to enlarge the size of a previously formed hole by an incremental amount, to adjust the size of a previously formed hole to within a tighter tolerance than may be otherwise achieved by other milling tools, and/or to improve the surface finish of a previously formed hole. In some cases, reamers may also be used for the removal of burrs from a workpiece after an initial machining operation.

To maintain a high quality surface finish, reamers are conventionally fabricated using a number of teeth on a working portion, the teeth separated by a corresponding number of flutes extending axially along the length of the working portion. Utilizing straight or helically extending flutes along the length of the working portion permits the evacuation of chips generated during a reaming operation. However, using such a flute design effectively limits available geometries and architectures for reamers, preventing the utilization of designs capable of achieving relatively high material removal rates.

Reamer design continues to evolve in response to the changing demands of hole making applications, thereby calling for the development of new reamer architectures and configurations.

SUMMARY

In one aspect, reamers are described herein comprising a plurality of cutting teeth separated by radially extending flutes. For example, a reamer described herein comprises a cutting portion including a plurality of cutting teeth separated by flutes, the cutting teeth defining an outer diameter of the cutting portion and the flutes extending radially to define an inner diameter of the cutting portion.

In another aspect, a method described herein comprises increasing the number of teeth on the cutting portion of a reamer of fixed outer diameter by separating the cutting teeth by flutes extending radially to define an inner diameter of the cutting portion.

These and other embodiments are described in greater detail in the detailed description which follows.

BRIEF DESCRIPTION OF THE DRAWINGS

FIG. 3A illustrates a side view of a reamer according to one embodiment described herein.

FIG. 3B illustrates a cross-sectional view of a reamer according to one embodiment described herein.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Reamers

Figures 1A, 1B:
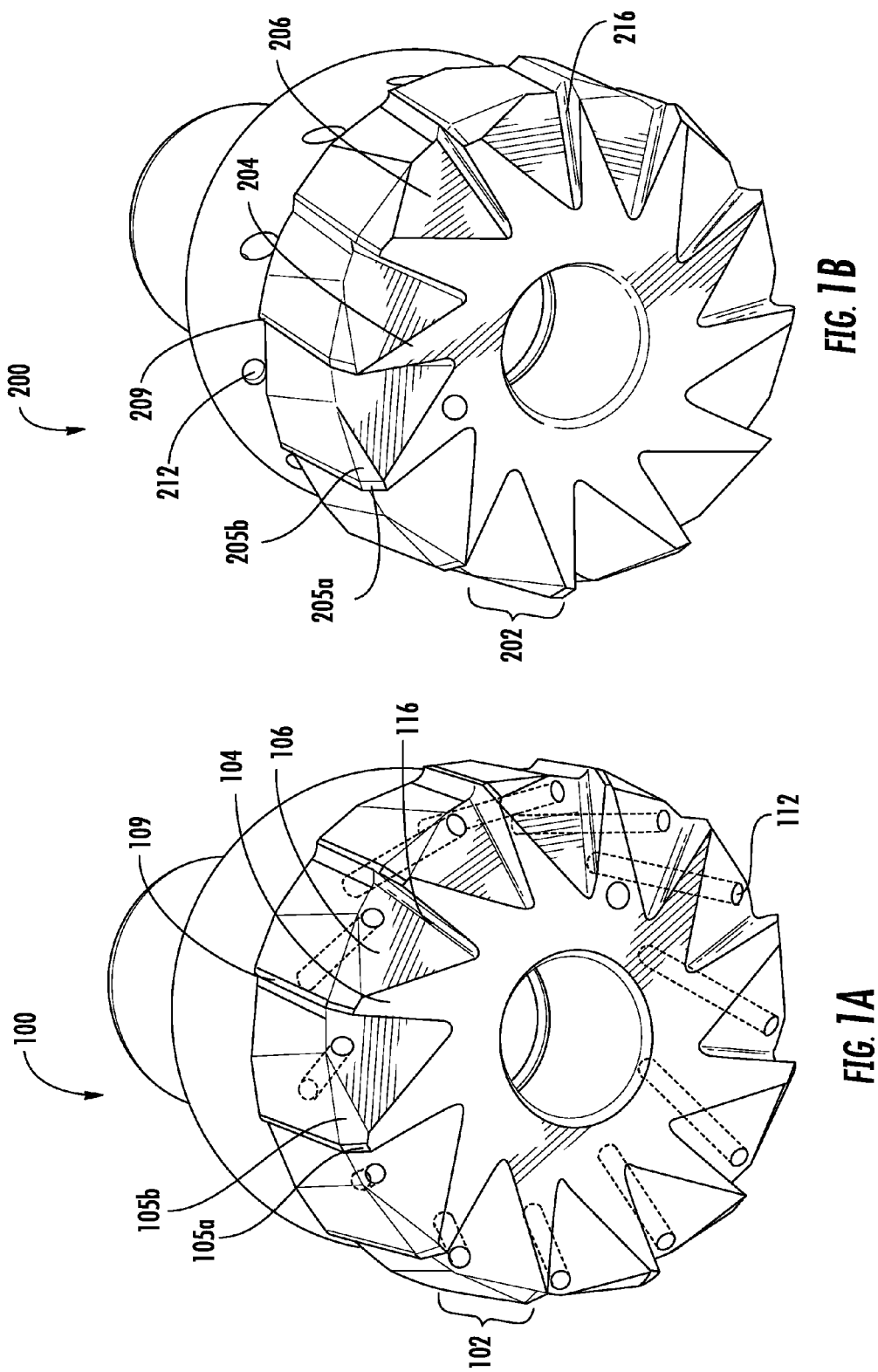
FIG. 1A illustrates a perspective view of a reamer according to one embodiment described herein.
FIG. 1B illustrates a perspective view of a reamer according to one embodiment described herein.

Referring now to FIG. 1A, there is illustrated a reamer, generally designated as reference number 100, in accordance with one embodiment described herein. As illustrated in FIG. 1A, the reamer (100) comprises a cutting portion (102) including a plurality of cutting teeth (104) separated by flutes (106), the cutting teeth (104) defining an outer diameter of the cutting portion (102) and the flutes (106) extending radially to define an inner diameter of the cutting portion. In some embodiments, the radially extending flutes do not extend along the entirety of the cutting portion in an axial direction.

Inner and outer diameters can be defined or configured in any manner not inconsistent with the objectives of the present invention. One embodiment is illustrated in a side view in FIG. 3A. In the embodiment of FIG. 3A, the outer diameter (OD) transitions to the inner diameter (ID) between cutting teeth (104). Further illustration of such a configuration is provided in FIGS. 1A and 1B. In some embodiments, the outer diameter (OD) transitions to the inner diameter (ID) along at least one cutting tooth relief (105a, 105b). Cutting teeth (104) can comprise or define at least one relief. For example, FIGS. 1A and 1B illustrate a cutting tooth configuration wherein cutting teeth (104, 204) define a primary relief (105a, 205a) and secondary relief (105b, 205b). The outer diameter (OD) can transition to the inner diameter (ID) along the primary and/or secondary reliefs (105a, 105b, 205a, 205b).

Figure 2A:
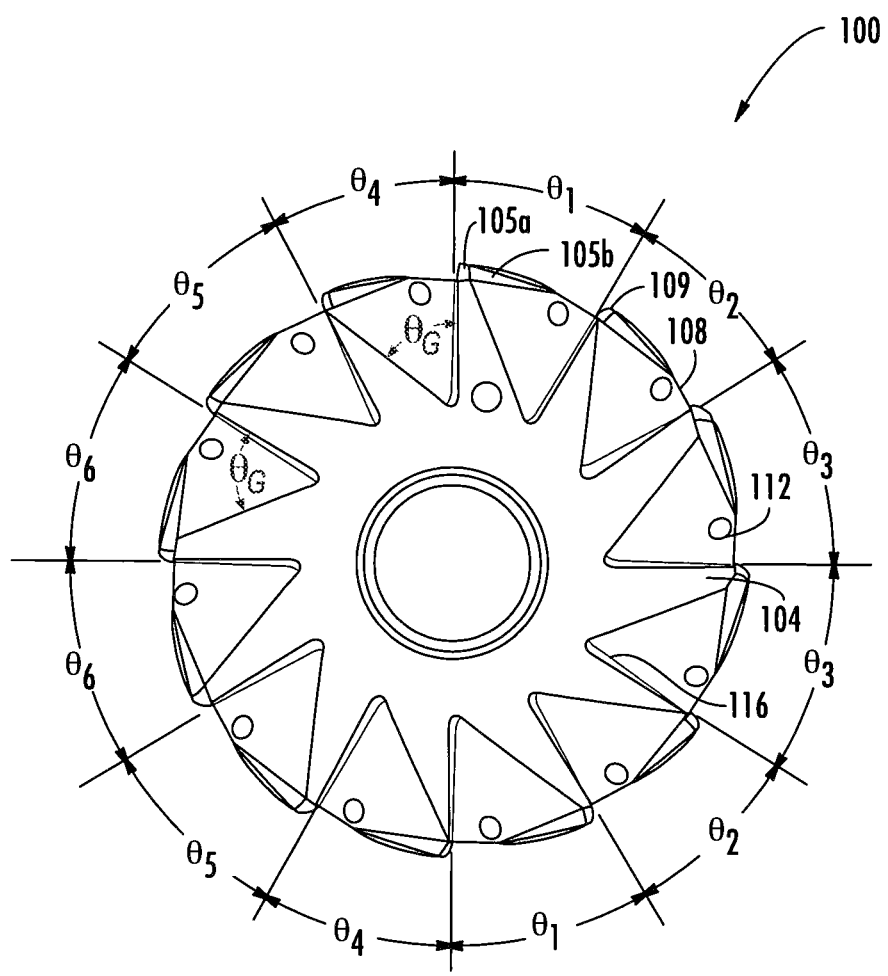
FIG. 2A illustrates an end view of a reamer according to one embodiment described herein.
Figure 2B:
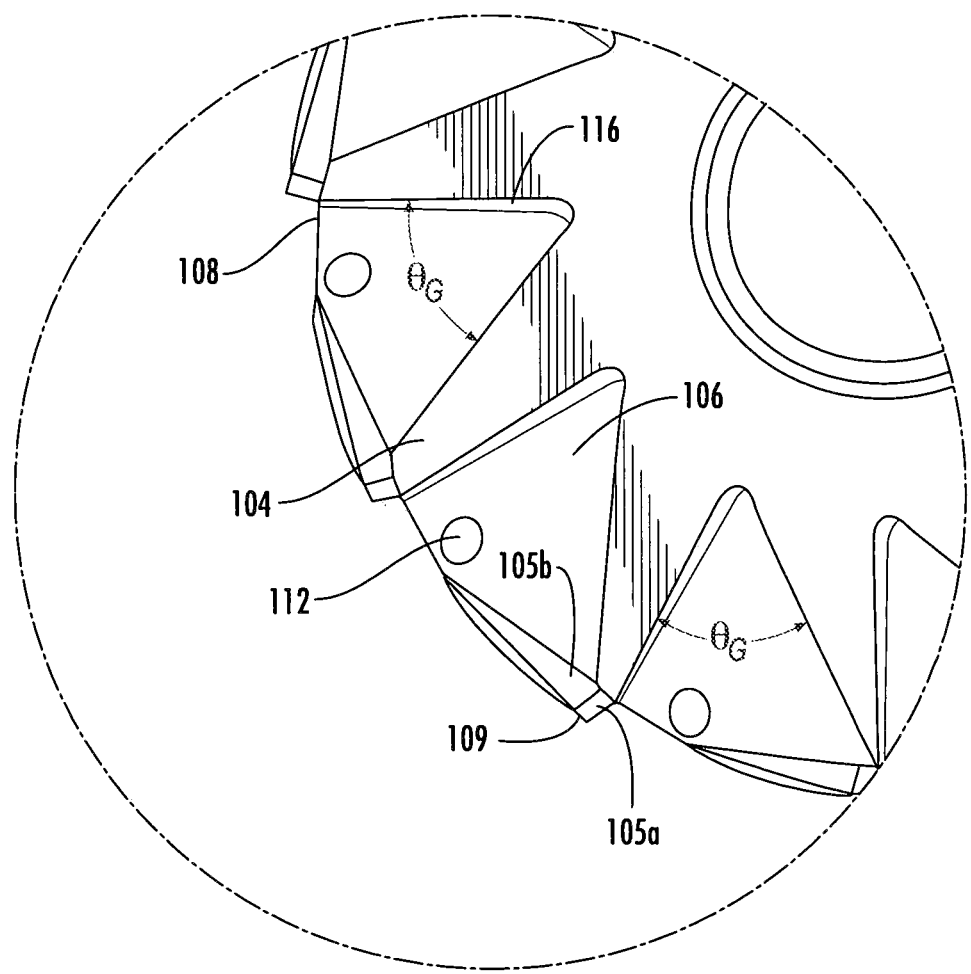
FIG. 2B illustrates a sectional view of the reamer of FIG. 2A.

The radially extending flutes can have any shape or be positioned in any configuration not inconsistent with the objectives of the present invention. In some embodiments, the radially extending flutes (106) are polygonal. For example, as illustrated in FIGS. 2A and 2B, the radially extending flutes (106) can be generally triangular shaped. In certain other cases, the radially extending flutes can be generally quadrilateral shaped. Each flute defines a gash angle, $\theta_G$, defined by a rake face of one tooth (104) and an adjacent flute (106). In some embodiments, at least two flutes (106) define substantially the same gash angle ($\theta_G$). Further, in some cases, all of the flutes (106) define substantially the same gash angle ($\theta_G$), as illustrated in FIG. 2A. Moreover, one or more flutes (106) can define or include any additional features not inconsistent with the objectives of the present invention. For example, at least one flute can define a chip-breaker feature (116) as illustrated in FIG. 1A. In some embodiments, all or substantially all flutes (106) define a chip-breaker feature (116). Any chip-breaker feature (116) can be used not inconsistent with the objectives of the present invention. For example, in some cases, the chip-breaker feature (116) is a chip-breaker surface. In certain other cases, a chip-breaker feature (116) comprises or defines a complex polygonal shape.

Reamers described herein comprise a plurality of cutting teeth. In some cases, as illustrated in FIG. 2A, at least two cutting teeth (104) are indexed unequally relative to one another. In some embodiments, at least three or at least four cutting teeth (104) are indexed unequally relative to one another. Index angles of unequal value are indicated in FIG. 2A as $\theta_1$, $\theta_2$, $\theta_3$, $\theta_4$, $\theta_5$, and $\theta_6$. Although FIG. 2A illustrates one embodiment of a pattern of index angles for a reamer described herein, it is to be understood that index angles can be individually or collectively adjusted to prevent chatter along the cutting portion (102) of the reamer during cutting operations in any manner not inconsistent with the present invention. For example, in some cases, all of the cutting teeth are disposed at different index angles relative to one another. Further, in some cases, at least one pair of cutting teeth is indexed such that each tooth in the pair is disposed 180° apart from the other tooth about the cutting portion. In the embodiment illustrated in FIG. 2A, such a pair is designated by a circle on one of the paired cutting teeth (104). Moreover, in some embodiments, a reamer described herein comprises at least two pairs of teeth disposed 180° apart, or at least three pairs of teeth disposed 180° apart. In such embodiments, a diameter measured along a pair of opposing cutting teeth indexed 180° apart corresponds to the outer diameter (OD). In some embodiments, the cutting portion (102) defines a chamfered portion (114) extending between the inner diameter (ID) and the outer diameter (OD). In such embodiments, the cutting teeth (104) can be disposed partially or entirely on the chamfered portion (114), as in FIG. 3A. A chamfered portion (114) can be disposed at any chamfer angle and have any chamfer length not inconsistent with the objectives of the present invention.

The outer diameter of the reamer can have any shape or architecture along a circumference thereof. For example, the outer diameter can be substantially circular. In some embodiments, as illustrated in FIGS. 2A and 2B, the outer diameter comprises a plurality of axial grooves (108). Axial grooves (108) can be disposed between margins (109) along the circumference of the outer diameter (OD). In some configurations, as illustrated in FIG. 1A, radially extending flutes (106) can terminate in axial grooves (108) positioned between margins (109) of the cutting portion (102). In such embodiments, the axial grooves (108) can provide relief, reducing contact between the outer diameter (OD) and a workpiece being machined (not shown). Such a configuration can reduce torque necessary to machine the workpiece, and can otherwise extend the life of the reamer. In some embodiments, the axial grooves are shallow axial grooves. A "shallow" axial groove, for reference herein, is sized in a manner to restrict or prevent the passage of chips created during a reaming operation from evacuating axially beyond the cutting portion. In such embodiments, chips are evacuated in the axial direction of cut, and are not evacuated through the entry hole of the workpiece.

Reamers described herein can further define at least one fluid transport channel. FIG. 3B illustrates a cross-sectional view of one embodiment of a reamer comprising at least one fluid transport channel. In the embodiment of FIG. 3B, the fluid transport channel (110) extends helically along an interior portion of the reamer (100), however other configurations are also possible. For example, in some cases, the fluid transport channel (110) can extend axially along an interior of the tool. Fluid transport channels terminate in at least one fluid transport hole. In some embodiments, as in FIG. 1A, fluid transport channels terminate in fluid transport holes (112) located in surfaces of the flutes (106). In additional embodiments, fluid transport channels can terminate along the reamer in a position other than flute surfaces. For example, as illustrated in FIG. 1B, fluid transport channels (not shown) can terminate in fluid transport holes (212) axially away from the cutting portion. In the embodiment of FIG. 1B, fluid transport holes (212) are distal to a cutting portion (202) of the reamer (200). Such embodiments can permit fluid, such as coolant or lubricant, to be flowed toward the cutting portion (202) from a position axially behind the cutting portion (202).

II. Methods of Increasing the Number of Teeth on a Reamer

In another aspect, a method described herein comprises increasing the number of teeth on the cutting portion of a reamer of fixed outer diameter by separating the cutting teeth by flutes extending radially to define an inner diameter of the cutting portion.

Such a method can be utilized to form any reamer consistent with the foregoing description in Section I of the present disclosure. Further, adjustment to individual components, elements, or portions of a reamer described herein can be undertaken to achieve one or more desired results, parameters, or configurations consistent with the foregoing in Section I of the present disclosure. For example, radially extending flutes can be generally-triangular shaped. In some embodiments, at least two of the flutes define substantially the same gash angle. Further, in some cases, the cutting teeth can each define a cutting edge, the method further comprising disposing the cutting edge of at least two teeth at differing index angles. Methods described herein can further comprise disposing at least one fluid transport channel in the reamer. The at least one fluid transport channel can terminate in at least one fluid transport hole disposed on the cutting portion. In some cases, the at least one fluid transport channel can terminate in at least one fluid transport hole disposed axially away from the cutting portion.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A reamer comprising:
 a cutting portion including a plurality of cutting teeth separated by flutes, wherein each flute generally extends along a radial direction with respect to the reamer;
 each flute terminating at an outer edge which extends between an outer diameter of the cutting portion and an inner diameter of the cutting portion;
 wherein the inner diameter of the cutting portion is defined at a distal end of the reamer;
 wherein the outer edge is oriented in a direction that does not lie in parallel with respect to a radial direction of the reamer or with respect to an axial direction of the reamer;
 wherein the flutes each comprise a surface that is generally triangular-shaped, flat and planar, and that terminates at the outer edge; and
 wherein the generally triangular-shaped surface is fully oriented along a plane that does not lie in parallel with respect to a radial direction of the reamer or with respect to an axial direction of the reamer;
 wherein each of the flutes further terminates at a corresponding axial groove positioned between margins of the cutting portion;
 wherein the generally triangular-shaped surface of each of the flutes extends between:
 two generally radial sides;
 the outer edge; and the corresponding axial groove;

the at least one cutting tooth relief comprising a primary relief and a secondary relief; and the outer edge transitioning from the outer diameter to the inner diameter along at least the secondary relief;

wherein the outer edge is oriented at an acute and non-zero angle with respect to an adjacent one of the two generally radial sides.

2. The reamer of claim 1, wherein each axial groove is configured to prevent chip evacuation in an axial direction beyond the cutting portion.

3. The reamer of claim 1, further comprising at least one fluid transport channel, wherein the at least one fluid transport channel terminates in at least one fluid transport hole at a surface of at least one of the flutes and is directed toward a cutting edge of a cutting tooth.

4. The reamer of claim 1, further comprising at least one fluid transport channel, wherein the at least one fluid transport channel terminates in at least one fluid transport hole axially away from the cutting portion.

5. The reamer of claim 1, wherein at least two of the flutes define substantially the same gash angle.

6. The reamer of claim 5, wherein all of the flutes define substantially the same gash angle.

7. The reamer of claim 1, wherein two of the cutting teeth are unequally indexed.

8. The reamer of claim 1, wherein:

at least one of the flutes defines a chip-breaker feature; and a surface of the at least one of the flutes extends between the outer edge and the chip-breaker feature.

9. The reamer of claim 1, wherein the reamer defines a chamfered portion, and wherein the cutting teeth are disposed on the chamfered portion.

10. The reamer of claim 1, wherein:

each of the cutting teeth comprises a cutting edge; and the primary relief extends between one of the cutting edges and an edge adjoining the secondary relief.

11. A method of increasing the number of teeth on the cutting portion of a reamer of fixed outer diameter, said method comprising:

separating the cutting teeth by flutes, wherein each flute generally extends along a radial direction with respect to the reamer;

each flute terminating at an outer edge which extends between the outer diameter of the cutting portion and an inner diameter of the cutting portion;

wherein the inner diameter of the cutting portion is defined at a distal end of the reamer;

wherein the outer edge is oriented in a direction that does not lie in parallel with respect to a radial direction of the reamer or with respect to an axial direction of the reamer;

wherein the flutes each comprise a surface that is generally triangular-shaped, flat and planar, and that terminates at the outer edge; and wherein the generally triangular-shaped surface is fully oriented along a plane that does not lie in parallel with respect to a radial direction of the reamer or with respect to an axial direction of the reamer;

wherein each of the flutes further terminates at a corresponding axial groove positioned between margins of the cutting portion;

wherein the generally triangular-shaped surface of each of the flutes extends between:
two generally radial sides;
the outer edge; and
the corresponding axial groove;

the at least one cutting tooth relief comprising a primary relief and a secondary relief; and the outer edge transitioning from the outer diameter to the inner diameter along at least the secondary relief;

wherein the outer edge is oriented at an acute and non-zero angle with respect to an adjacent one of the two generally radial sides.

12. The method of claim 11, wherein at least two of the flutes define substantially the same gash angle.

13. The method of claim 11, wherein the cutting teeth each define a cutting edge, the method further comprising disposing the cutting edges of at least two teeth at differing index angles.

14. The method of claim 11 further comprising disposing at least one fluid transport channel in the reamer.

15. The method of claim 14, wherein the at least one fluid transport channel terminates in at least one fluid transport hole disposed on the cutting portion.

16. The method of claim 14, wherein the at least one fluid transport channel terminates in at least one fluid transport hole disposed axially away from the cutting portion.

* * * * *